July 4, 1933.  S. E. BOUCHARD  1,916,601

OPHTHALMIC MOUNTING

Filed April 23, 1931

SAMUEL E. BOUCHARD
INVENTOR

BY *J. H. Ollestad*

ATTORNEY

Patented July 4, 1933

1,916,601

UNITED STATES PATENT OFFICE

SAMUEL E. BOUCHARD, OF ROCHESTER, NEW YORK, ASSIGNOR TO BAUSCH & LOMB OPTICAL COMPANY, OF ROCHESTER, NEW YORK, A CORPORATION OF NEW YORK

OPHTHALMIC MOUNTING

Application filed April 23, 1931. Serial No. 532,217.

This invention relates to ophthalmic mountings and more particularly it has reference to eyeglass mountings commonly known as finger-piece mountings which embody pivoted, spring-actuated nose guards.

One of the objects of my invention is to provide an improved eyeglass mounting of the type described which can be readily made and conveniently assembled without the use of screws or other threaded members. Another object is to provide a mounting of this type with a guard lever having spaced bearing portions. A further object is to provide a mounting having a guard lever movably mounted on a pintle and means carried by the lever for retaining it on the pintle. These and other objects and advantages reside in certain novel features of construction, arrangement and combination of parts as will hereinafter be more fully described and pointed out in the appended claims.

Referring to the drawing.

Figure 1:
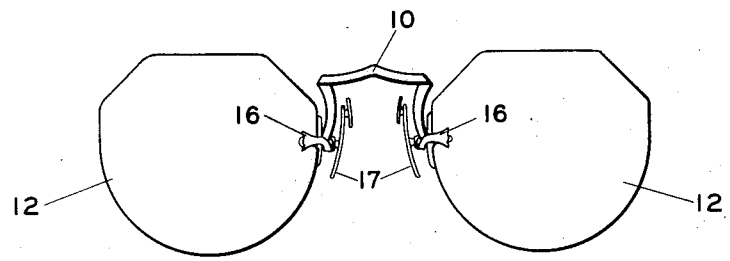
Fig. 1 is a front elevation of a pair of eyeglasses embodying my invention.

A preferred embodiment of my invention is shown in the drawing wherein 10 indicates a bridge which is provided, at each end, with lens holding means, such as clamp 11, for holding lenses 12. Fixedly secured to the rear side of bridge 10, adjacent to clamp 11, is a downwardly projecting pivot pin or pintle 13. A guard lever, indicated generally at 14, has two spaced bearing portions 15 and 15' by means of which the lever 14 is mounted to turn on pintle 13. The forward part of the lever 14 has an operating handle 16 which overlies the front of lens 12 while the rearward part of the lever 14 has a nose-engaging portion 17 carrying a pivotally mounted nose pad 18. The lever 14 also has an intermediate adjusting loop 19 which provides for adjustments of the nose-engaging portions.

Figure 2:
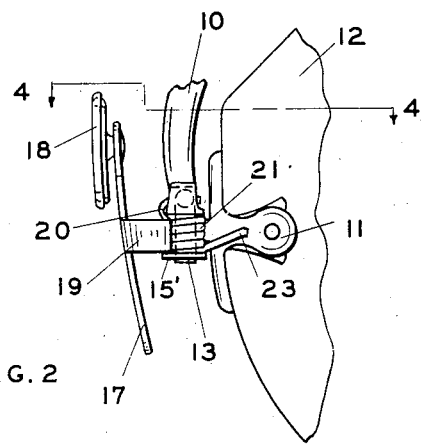
Fig. 2 is a fragmentary rear elevation of a mounting embodying my invention.
Figure 5:
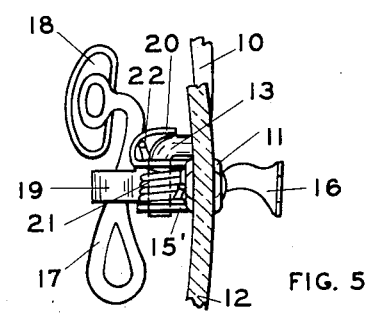
Fig. 5 is a view taken on line 5—5 of Fig. 4.

Integral with the lever 14 and projecting outwardly from the bearing portion 15 is the retaining member or finger 20 which is adapted to be bent over into contact with pintle 13 for the purpose of detachably securing the lever 14 on pintle 13, as clearly shown in Fig. 5. A coil spring 21 is positioned between the two spaced bearing portions 15 and 15' and when the lever 14 is in position, as shown in Figs. 2 and 5 the pintle 13 extends down through the opening in the coil spring 21. One end 22 of coil spring 21 bears against the finger 20 while the other end 23 of the spring bears against the lens clamp 11 when the mounting is assembled, as shown in Fig. 2. The guard levers are thus placed under spring tension and the guards may be separated against the action of the springs by means of the handles 16, as will be apparent to those skilled in the art.

Figure 3:
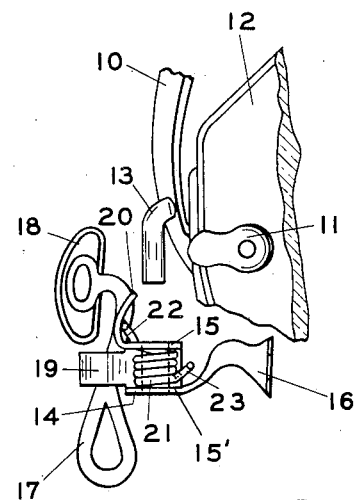
Fig. 3 is a fragmentary view showing parts in separated relation.
Figure 4:
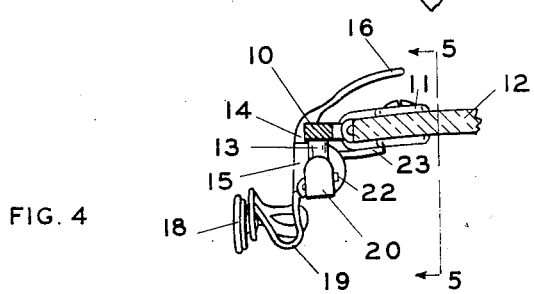
Fig. 4 is a view taken on line 4—4 of Fig. 2.
Figure 6:
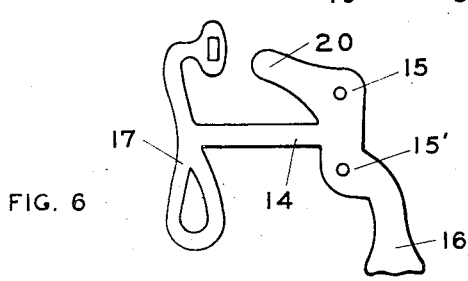
Fig. 6 shows a plan view of the guard lever blank before it is shaped.

In manufacturing my improved mounting, the guard lever may be stamped out of suitable sheet material, as shown in Fig. 6, after which the stamping is formed into the desired shape. In assembling my mounting the coil spring 21 is positioned between the bearing portions 15 and 15', the pintle 13 is placed within the openings of the bearing portions and the finger 20 is bent downwardly into contact with pintle 13 as shown in Fig. 5. The lever 14 can be readily removed by merely bending back the finger 20 and withdrawing the pintle 13, as shown in Fig. 3. This method of assembling the parts affords great convenience to the optician and constitutes one of the features of my invention.

In the usual mountings of this type the guard lever is pivotally mounted on a screw with the consequence that the screw works loose after the mounting has been used for a while. Loose screws in finger-piece mountings cause considerable annoyance and trouble and much effort has been spent in trying to devise satisfactory means for preventing the loosening of the screws when the mounting is subjected to the conditions of use. I am able to overcome these difficulties by eliminating threaded pivot mountings for the guard lever. This is a distinct improvement and constitutes one of the features of my invention. My improved mounting has two spaced bearing portions which provide proper mounting and movement of the guard lever and eliminates the wobbly action of the guard lever of the prior art. Moreover, the coil spring is positioned between the two bearing portions so that my improved mounting presents a neat appearance.

From the foregoing it will be apparent that I am able to attain the objects of my invention and provide an improved fingerpiece mounting which is highly efficient in operation, neat in appearance and capable of being readily and conveniently made and assembled. Various modifications can obviously be made without departing from the spirit of my invention.

I claim:

1. An eyeglass mounting comprising a bridge, lens holding members secured to said bridge, a downwardly projecting pivot pin having its upper end secured to said bridge, a guard lever mounted to turn on said pin, means for retaining said lever on said pin, said means comprising a bendable finger carried by said lever.

2. An ophthalmic mounting having in combination a support, a pintle having one end secured to said support, said pintle extending laterally from said support and thence downwardly to provide lateral and vertical portions, a guard lever mounted to turn on the vertical portion of said pintle and means for detachably retaining said lever on said pintle, said means comprising a bendable finger carried by said lever, said finger being bent over to contact with the lateral portion of said pintle.

3. An eyeglass mounting comprising lens holding members, a bridge connecting said members, a downwardly projecting pintle secured to said bridge, a guard lever mounted to turn on said pintle, a nose pad carried by said lever, said lever having two spaced bearing portions, a coil spring encircling said pintle and positioned between said bearing portions, and means for detachably retaining said lever on said pintle, said means comprising a bendable finger carried by said lever.

4. An ophthalmic mounting having in combination a support, a pin mounted on said support, a guard lever having two spaced bearing portions whereby said lever is mounted to turn on said pin and means for detachably retaining said lever on said pin, said means comprising a reversely bent finger which is formed integral with one of said bearing portions and engages said pin.

SAMUEL E. BOUCHARD.